United States Patent [19]

Legris

[11] Patent Number: 4,712,809
[45] Date of Patent: Dec. 15, 1987

[54] METHOD AND DEVICE FOR ASSEMBLING SEVERAL COMPONENTS, PARTICULARLY CONNECTION FITTINGS FOR FLUID COUPLINGS

[75] Inventor: André Legris, Rennes, France

[73] Assignee: Société Anonyme Styled Legris, Rennes, France

[21] Appl. No.: 694,459

[22] PCT Filed: Apr. 18, 1984

[86] PCT No.: PCT/FR84/00108

§ 371 Date: Dec. 18, 1984

§ 102(e) Date: Dec. 18, 1984

[87] PCT Pub. No.: WO84/04069

PCT Pub. Date: Oct. 25, 1984

[30] Foreign Application Priority Data

Apr. 18, 1983 [FR] France .............................. 83 06306

[51] Int. Cl.$^4$ .............................................. F16L 13/14
[52] U.S. Cl. ........................................ 285/21; 285/281; 285/239; 285/39; 285/382; 264/68; 156/73.5; 29/157 R; 29/525; 29/516; 29/DIG. 24
[58] Field of Search ................... 156/73.1, 73.5, 294, 156/580; 285/238, 39, 21, 272, 278, 280, 281; 228/2, 112; 29/157 R, 515, 516, 520, 525, 283.5, DIG. 24; 264/68, 249, 274

[56] References Cited

U.S. PATENT DOCUMENTS

| 2,933,428 | 4/1960 | Mueller | 156/73.5 |
| 2,942,748 | 6/1960 | Anderson | 264/68 |
| 3,112,939 | 12/1963 | Graham | 285/238 |
| 3,444,018 | 5/1969 | Hewitt | 156/73.5 |
| 3,637,240 | 1/1972 | Meier | 285/238 |
| 3,705,380 | 12/1972 | Roberts | 156/73.1 |
| 3,728,184 | 4/1973 | Burke et al. | 156/73.1 |
| 3,817,561 | 6/1974 | Kay | 285/238 |
| 3,817,562 | 6/1974 | Cook et al. | 285/238 |
| 3,989,280 | 11/1976 | Schwarz | 285/21 |
| 4,003,665 | 1/1977 | Dreyer et al. | 156/73.1 |
| 4,059,294 | 11/1977 | Falcone | 285/238 |
| 4,090,898 | 5/1978 | Tuskos | 156/73.5 |
| 4,121,588 | 10/1978 | Geiger | . |
| 4,128,264 | 12/1978 | Oldford | 285/238 |
| 4,198,077 | 4/1980 | Oldford | 285/238 |
| 4,339,868 | 7/1982 | Mazzer | 29/237 |
| 4,419,804 | 12/1983 | Axthammer | 29/520 |
| 4,560,189 | 12/1985 | Lang et al. | 285/158 |

FOREIGN PATENT DOCUMENTS

| 201373 | 12/1958 | Austria | 285/238 |
| 2218287 | 11/1972 | Fed. Rep. of Germany | 156/73.5 |
| 2025834 | 9/1970 | France | . |
| 2056366 | 5/1971 | France | . |
| 2167484 | 8/1973 | France | . |
| 2232240 | 12/1974 | France | . |
| 2314812 | 11/1977 | France | . |
| 2390966 | 12/1978 | France | . |
| 2399608 | 3/1979 | France | . |
| 2452366 | 10/1980 | France | . |
| 337426 | 5/1959 | Switzerland | . |
| 1234219 | 6/1971 | United Kingdom | . |
| 1279452 | 6/1972 | United Kingdom | . |

OTHER PUBLICATIONS

Branson Ultrasonics Corporation Publication, 1980, PW-4.

Primary Examiner—Alexander Grosz
Assistant Examiner—Eric K. Nicholson
Attorney, Agent, or Firm—Marks Murase & White

[57] ABSTRACT

A method and device for assembling connection fittings such as couplings, between hard components, such as metal pipe and a body formed of a softer substance to obtain a permanent coupling able to withstand aging and thermal shock conditions. The parts coupled are formed of materials of different hardness which are first force fit together. One of the parts is then rotated at high speed so that the part made of the softer material is locally heated until it melts. The result is a snug but swivelable connection free of internal stress.

11 Claims, 6 Drawing Figures

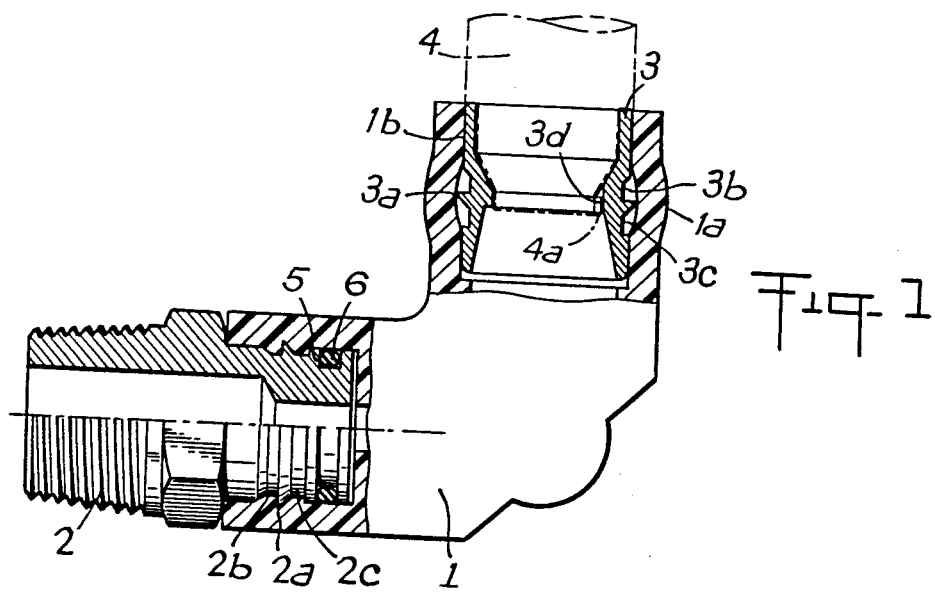
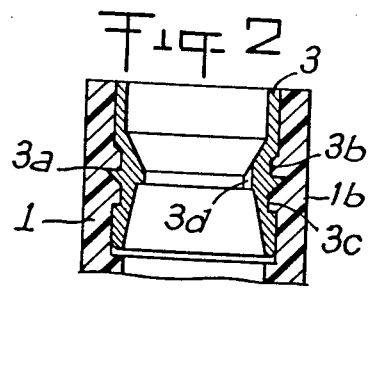
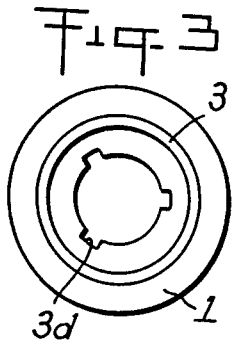
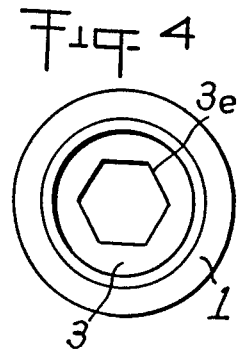
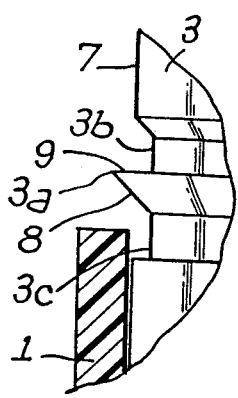
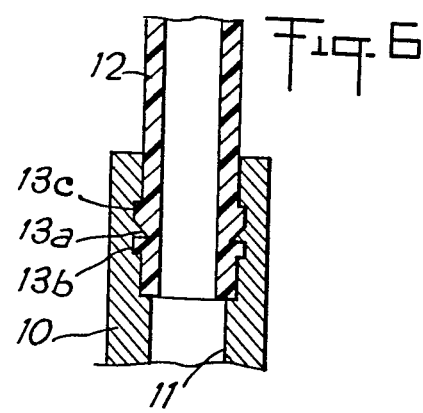

METHOD AND DEVICE FOR ASSEMBLING SEVERAL COMPONENTS, PARTICULARLY CONNECTION FITTINGS FOR FLUID COUPLINGS

BACKGROUND OF THE INVENTION

This invention concerns a method and a device for assembling several components and particularly connection fittings for fluid couplings.

Couplings are known in the prior art into which components made of a hard material (such as metal, or plastics reinforced with very hard glass fibers) are force fitted, for example with retaining ribs, into bodies of a softer material, especially plastic.

By this method, the material remains stressed and often, after a long time, breaks in an unacceptable and hazardous manner.

Another prior art method consists of fitting hard components, in particular metal inserts, into parts of a softer material with the help of ultrasonics. Unfortunately, this approach cannot be utilized when the inserted bodies are too large or when the components are too long.

Furthermore, the latter method does not always eliminate internal stresses in the softer substance of the body and the risks of rupturing in the long run, ie. after one to five years, remains high, something which is unacceptable in terms of safety for fluid couplings.

There are still other methods of fitting inserts, especially metallic inserts, into a part by which capture in the supporting part is accomplished either by expansion of the insert after insertion or by elasticity, as in the case of split inserts, or otherwise by self-tapping, as in the case where an insert effectively "machines" its capture means by rotation. All of these methods share a common drawback stemming from the fact that considerable tension must be maintained between the parts after they have been fit together, which might cause breaks in the long run.

Still another known method consists of inserting parts by remolding them into other parts at the time of injection. However, this is a costly process, because the inserts must be manually placed inside the mold, and accordingly penalizes throughput.

The present inventors had attempted to overcome this problem by utilizing a device which was the subject of French Pat. No. 2,399,608 in which a ribbed end fitting is force fitted into a body made of a softer material in such a manner that the relatively slow rotation of the rib drives a groove in the softer body. However, this method has not proved satisfactory due to the difficulty of making such a rib in the hard material, for example metal.

Still another known method involves the friction welding of two parts by pressing them together as they are rotated and thus heating them until local melting bonds them together. But this works only with identical materials, whether hard or soft, never with two materials having different hardnesses, as required for the present invention.

SUMMARY OF THE INVENTION

The present invention provides a method of assembling couplings between hard components, particularly metal components, and a part or body of a softer substance so as to obtain a long-lasting, indestructible union, able to withstand the typical aging and thermal shock conditions encountered in a workplace, or outdoors in a humid and moist environment.

In accordance with the invention, the parts, which are made from materials with different hardnesses, are force fitted together and one of them is rotated at high speed so that the other part, made of softer material, locally heats up and melts, in order to make the two parts fit snugly and swivelably, while nearly eliminating internal stresses.

This invention enables such couplings to be made easily and reliably and is thus an improvement to French Pat. No. 2,399,608.

The harder component designed to be fitted into the body of the softer fitting has at least one cylindrical part and its cylindrical fitting part is given one or more small ridges, the height of which is specifically determined as a function of the softer body's diameter and elasticity. Two circumferential grooves are provided, one to either side of said ridge or rib, to accommodate excess material. The shape of the ridge or rib is important and is a function of the resistance of the softer body and of wear on assembly. The angle can have any value from 45° to 80°, depending on the material used to make the body.

BRIEF DESCRIPTION OF THE DRAWINGS

The various features and advantages of the invention will be more readily understood in light of the following description of several embodiments thereof, made with reference to the accompanying drawings, in which:

FIG. 1 is a partial cutaway view of a coupling of a connecting fitting with two connecting members, one of which is shown prior to being rotatively driven;

FIG. 2 is a cutaway view of one end of a connecting member after coupling and of one connecting member already fitted and rotatively driven;

FIG. 3 is a top view of one embodiment of the connecting member;

FIG. 4 is a top view of an alternative embodiment of the connecting member;

FIG. 5 is a side view, on a larger scale, of the locking rib and the two clearance grooves in a connecting member; and FIG. 6 is a cutaway view of another coupling mode for a fitting having a rib and two internal clearance grooves.

DETAILED DESCRIPTION OF THE INVENTION

FIG. 1 shows a connecting fitting consisting of a tubular body 1 in one of whose ends is fitted a threaded connecting member 2 and in the other of whose ends is fitted a connecting member 3 which may consist of a collar designed to receive a securing means, such as a clamp, which is not shown in the drawing.

The body 1 is made of a material having a lesser hardness than that of connecting members 2 and 3 which are made of metal.

The connecting members 2 and 3, which are basically cylindrical, feature a circular peripheral ridge or tooth 2a, 3a located between two clearance grooves 2b, 2c and 3b, 3c, respectively.

In accordance with the method of the present invention, the connecting member 3 is force fitted into the softer body 1, as shown in FIG. 1, thus stressing the latter, said stress being the greatest at the peak of ridge 3a. Ridge 3a causes a deformation 1a due to the diametrical tensile stress in the bore 1b of body 1. The initial tensile stress occurring at the force fit between the connecting member 3 and the body 1 of the fitting results from the greater dimensioning of ridge 3q relative to the receiving part into which it is fitted.

In general the materials used to make fittings are themselves rather hard so that is becomes necessary to use a very hard insert, such as a metal insert, to obtain a suitable coupling, since the ridges 2A or 3A only slightly penetrate the body 1.

The next step is to rotatively drive the connecting member 3 relative to body 1, which is stationary and suitably supported.

To this end, a drive spindle 4 is engaged in the center bore of the connecting member 3 (FIGS. 1 and 3), which center bore is provided with slots 3d for receiving ribs 4a on the spindle 4 in order to rotatably interlock the spindle and connecting member.

According to an alternative embodiment depicted in FIG. 4, the connecting member 3 is provided with a hole 3e having a polygonal cross section, for insertion and rotatative interlocking of a matching drive spindle 4.

The spindle 4, which is connected to the drive means, thus rotatively drives the connecting member at a speed ranging from a few hundred to several thousand rpm, depending on the thickness of the body 1 in which the connecting member is being inserted. The required rotational drive time, which is accurately calculated, can range from one to several seconds, depending on the thicknesses and the materials that are placed in contact.

The starting local tensile stress between ridge 3a and body 1 generates friction between the two parts 3 and 4 which, during rotation of the connecting member 3 relative to the body 1, leads to the melting of body 1 whose substance is softer in zone 1b. The molten material, pushed back by the ridge 3a, flows into grooves 3b and 3c in the connecting member. Once the locking ridge 3a has created its niche, all the diametrical stress 1a is virtually resorbed, as illustrated in FIG. 2.

Melting from rotation can only be obtained at a certain contact speed, which requires a minimum rotational speed as defined hereinabove.

The present method is especially appropriate for connecting fittings into relatively thin parts, particularly in the case of thermoplastic parts and more specifically glass-fiber reinforced thermoplastics.

In FIG. 1, connecting member 2 is shown in its final position after having gone through rotation and melting.

Connecting member 2 has a groove 5 carrying an O-ring seal 6 which further enables body 1 to swivel relative to said member 2 in order to provide, besides tightness between member 2 and body 1, an orientating capability.

This affords the possibility, for example, of directing the elbow of connecting member 3 anywhere about the axis of member 2 by simple manual rotation. This possibility is very worthwhile when it is desired to set up several elbow fittings tightly side-by-side.

The O-ring 6, being only moderately squeezed, is not damaged during the rotation and melting step, either by rotation at high speed or by local melting above the ridge, due to the short rotation time required for member 2. Obviously however, it is best to place the ring seal 6 as far as possible from the ridge 2a and, therefore, from the melting zone.

FIG. 5 shows an embodiment in greater detail of the circular ridge 3a provided on the cylindrical part 7 of the connecting member 3, said ridge 3a being bounded by the intersection of a conical surface 8 and a secant plane 9 of the axis of said member.

The angle of the conical surface 8 can vary from 45° to 80° to facilitate fitting together with various materials used to make body 1.

The diameter of the ridge 3a is greater than that of the cylindrical part 7 in order to stress the substance of body 1 during force fitting. Grooves 3b and 3c are provided on either side of the ridge 3a to accommodate run in of the material after its melting.

FIG. 6 shows a coupling wherein an outside tubular part 10 is made from a hard material and receives in a bore 11 the end of a tubular part 12 made from a softer material.

To this effect, tubular part 10 is provided with an internal ridge 13a and two grooves 13b and 13c arranged on either side of ridge 13a as described hereinbefore. This method of coupling components, involving a force fitting step, followed by a rotation leading to a melting of the material, can be incorporated into an automated assembly system due to the short rotational time required to be applied to one of the members. It is also possible to rotatingly drive the connecting member 3 to a cylindrical part held by the clamp of a lathe or other rotating machine.

Obviously, various modifications can be made by someone skilled in the art to the device or the method described in the foregoing by way of non-limiting examples of the invention, without departing from the scope and spirit of the invention.

For example, the invention is not limited to the force fitting of parts where the softer material is a plastic material, but applies to the coupling of all materials of different hardnesses whereby one of the materials, through rotational friction, brings about the melting of the other material, accompanied by interpenetration and elimination of internal stresses (for example, fitting hard metal to a softer metal, ceramics to metal, and so on).

Moreover, the invention is not limited to applications for fluid couplings but applies to all cases where it is necessary to intimately join two components of different materials and hardnesses in an indestructible manner.

The method according to the invention concerns all types of industry, in particular fluid couplings, plumbing fittings, chemistry, electrical equipment, the plastics industry, the automotive industry, appliances, medical and dental equipment, toys, sanitary and gardening water supplies and more.

What I claim is:

1. A method of forming a stress-free, fluid tight, swivelable joint between members of different hardness for fluid coupling said members, said method comprising the steps of:
    (a) force fitting the harder of said members having a projecting ridge and adjacent groove into an opening in the other of said members, thereby locally deforming and stressing a portion of said opening opposing said ridge;
    (b) rotating the harder of said members at a speed sufficient to cause melting of at least some material of the locally deformed and stressed portion of said opening, whereby the melted material flows into said adjacent groove forming a fluid tight joint assembly without bonding said members, whereby said members are operable to swivel relative to each other.

2. The method of claim 1 wherein the step of rotating further comprises rotating said harder member at a speed of in the range of about three hundred to several thousand rpm for a predetermined time period.

3. The method of claim 2 further comprising the steps of providing an additional groove, spaced from said projecting ridge and disposing a sealing means in said second groove, wherein said step of rotating is performed at a low enough speed and for a short enough period of time to prevent damage to said sealing means.

4. The method of claim 1 wherein the shape of said projecting ridge is operable, during said step of rotating, to cause said melting while essentially maintaining its original geometry.

5. The method of claim 4 wherein said projecting ridge comprises a conical surface and said step of force fitting further comprises locally deforming only the portion of the softer of said members in the area adjacent said conical surface.

6. The method of claim 5 wherein the step of force fitting further comprises the step of locking said members by means of said local deformation and stressing prior to said step of rotating.

7. The method of claim 3 further comprising the step of providing grooves adjacent both sides of said projecting ridge and the step of rotating further comprises flowing said locally melted material into said grooves to eliminate said stress in said softer material without bonding said materials.

8. The method of claim 1 further comprising the step of inserting a removable drive means to said harder member prior to said step of rotating, and said step of rotating comprises engaging said drive means with an external rotational driving device while holding the softer of said members essentially stationary.

9. The method of claim 7 wherein said harder member comprises a cylindrical shaft-like connecting member and said softer member has a cylindrical opening for accepting said connecting member and wherein said projecting ridge and adjacent grooves are annularly disposed on a portion of said cylindrical connecting member which is inserted into said cylindrical opening.

10. The method of claim 7 wherein said additional groove is an annular groove disposed on a portion of said cylindrical connecting member which is inserted into said opening and said sealing means comprises an O-ring.

11. A stress-free assembly comprising:
a body formed from a first meltable material of a first hardness, said body having a generally cylindrical opening therein;
a generally cylindrical connecting member formed from a second material of a second hardness greater than said first hardness, said connecting member being sized to force fit into said opening;
said connecting member having an annular ridge, a first annular groove adjacent said annular ridge and a second annular groove spaced from said annular ridge, said annular ridge having a slightly larger diameter than said opening to locally deform a portion of said opening when force fit therein;
a sealing member disposed in said second annular groove;
said connecting member being shaped to receive means for rotating said connecting member relative to said body to thereby melt said locally deformed portion of said opening whereby the melted first material flows into said first annular groove, said body connecting member forming a stress-free, swivelable assembly essentially without bonding or welding said first and second materials.

* * * * *